May 19, 1953     L. E. MILLS     2,638,760
METHOD OF REFRIGERATION USING CONJUGATE SOLUTIONS
Filed Feb. 7, 1949
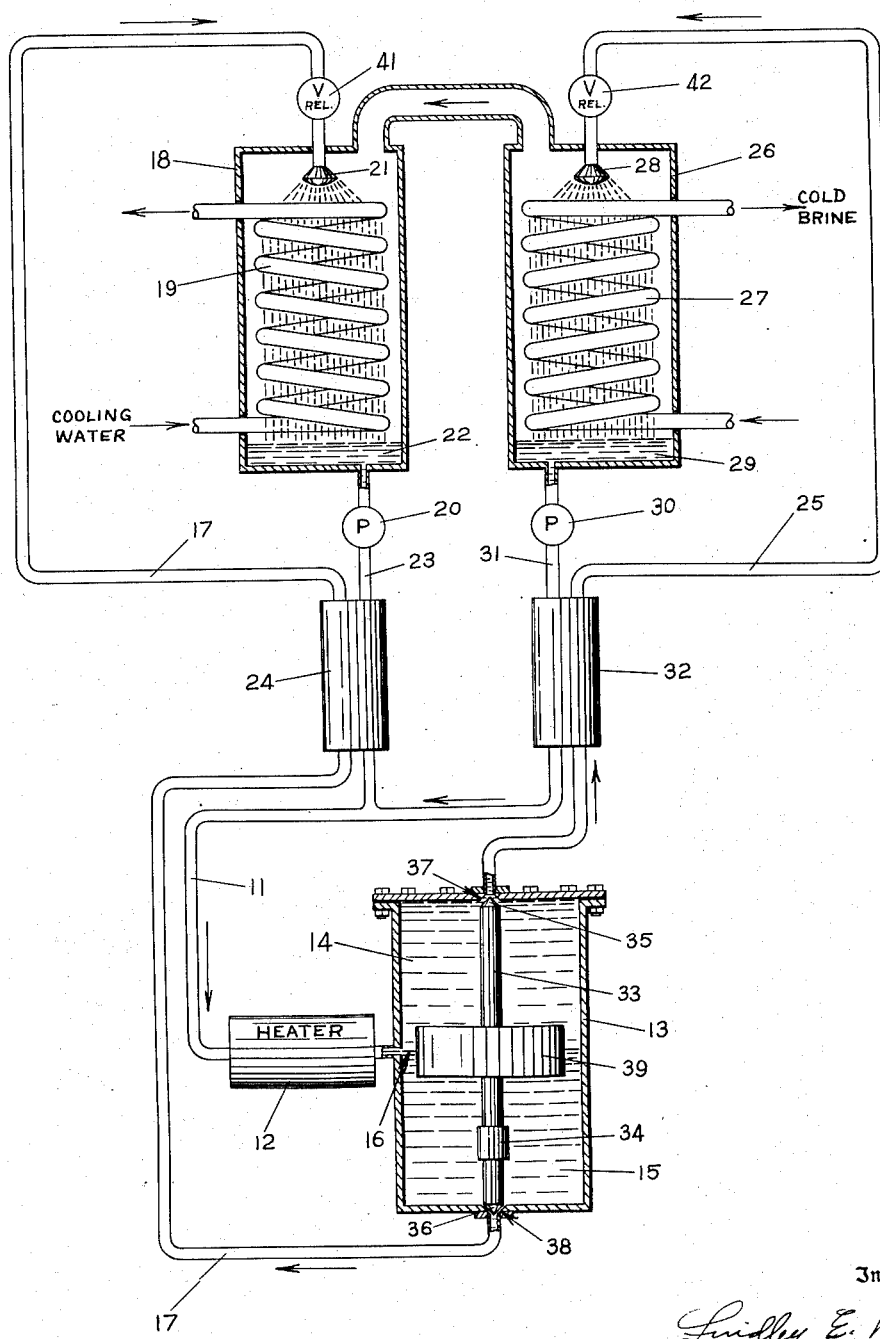
Inventor
Lindley E. Mills Patented May 19, 1953

2,638,760

UNITED STATES PATENT OFFICE 2,638,760

METHOD OF REFRIGERATION USING CONJUGATE SOLUTIONS

Lindley E. Mills, Kalamazoo, Mich.

Application February 7, 1949, Serial No. 75,079

5 Claims. (Cl. 62—179)

1

This invention relates to refrigeration, particularly to a new method of refrigeration characterized by its high degree of economy and by the simplicity of the equipment required to operate the cycle employed, and to systems of substances useful therein.

Refrigeration, other than that effected with natural ice, is generally accomplished by causing a suitable liquid to vaporize in a vaporizer under a pressure such that its boiling point is at or below the temperature of the refrigeration desired. A number of low-boiling substances have been used or proposed including ammonia, sulfur dioxide, carbon dioxide, dichlorodifluoromethane, methyl chloride, propane and many others including even water. A refrigerant having a high latent heat of vaporization is desirable to reduce the weight of material cycled per unit of refrigeration produced.

In the interest of economy it is necessary, except in the case of water, that the vaporized refrigerant be restored to its original liquid state so that it can be re-used. This has heretofore been accomplished in one of two principal ways. One way employed in what is generally referred to as the "absorption" method or cycle of refrigeration, involves absorbing the vapor from the vaporizer in a liquid absorbent in an absorber which is cooled, e. g. with air or with cooling water, to carry away or dissipate the heat of absorption. The solution thus formed is then heated in a boiler to vaporize the dissolved gas from the solution and the gas is then cooled, e. g. with cooling water, in a condenser to condense it to a liquid. The condensate is re-cycled to the vaporizer and the liquid remaining in the boiler is recycled to the absorber. This method of refrigeration is especially well suited to the use of ammonia as the refrigerant and of water as the absorbent.

The other principal way for restoring a vaporized refrigerant to its original liquid state, employed in what is generally referred to as the "compression" system or cycle of refrigeration, involves compressing the gas mechanically and cooling it in a condenser to liquefy it. The condensate is then recycled to the vaporizer. This method has been operated extensively using anhydrous ammonia, sulfur dioxide, methyl chloride, dichlorodifluoromethane and many other low-boiling substances as the refrigerant.

It is apparent that the absorption method and the compression method of refrigeration each possesses certain disadvantages. In each method, a particular portion of the energy required to re-

2 store the gaseous refrigerant to its original liquid condition, which portion is roughly equivalent to the amount of refrigeration effected, i. e. to the heat abstracted from the vaporizer, is supplied to the refrigerant and subsequently removed and dissipated with water or other cooling means in the condenser before the refrigerant is obtained again in its original liquid form. This particular energy is, for the sake of convenience, herein referred to as the "energy of condensation" or "energy of liquefaction" of the refrigerant and its expenditure and subsequent dissipation is inherent in both methods heretofore described for restoring the refrigerant to its liquid state.

In the absorption method of refrigeration, the energy of liquefaction is supplied to the system as heat energy in the boiler, but the very nature of the method necessitates the supplying of substantial quantities of heat energy in addition to the heat of liquefaction to reverse the reaction which occurs in the absorber between the refrigerant and the absorbent. In the compression method of refrigeration, the energy of liquefaction, although representing a larger proportion of the total energy of restoration required than in the absorption system, is supplied in the form of mechanical energy for compressing the gas. Such mechanical energy is costly and the method also requires the use of machinery which is costly both to install and to maintain. In either method, the energy of liquefaction represents a substantial proportion of the total energy required to be expended to return the vaporized refrigerant to its liquid form. It is apparent that any method of refrigeration and any system of substances wherewith the method could be carried out which would reduce substantially from that heretofore necessary the amount of either heat or mechanical energy required to restore a gaseous refrigerant to the liquid state would be of great value.

It has now been found, and is herein first disclosed, that refrigeration can be effected readily using simple and inexpensive machinery and with a substantial reduction in the total amount of energy required to restore the gaseous refrigerant to the liquid state ready for recycling to the vaporizer using a particular system of cooperating substances and a particular method or cycle of operation hereinafter more particularly described.

Systems useful in the operation of the method of the invention are herein termed "negative conjugate systems," and are defined as systems comprising at least a low-boiling component and a high-boiling component which, under suitable conditions of temperature and pressure forms conjugate solutions, one of which, herein termed the "low-boiling solution," is rich in the low-boiling component, and wherein the coefficient with respect to temperature of the equilibrium concentration of the low-boiling component in the low-boiling solution is positive, i. e. wherein the concentration of the low-boiling component in the low-boiling solution when the system is in equilibrium increases with increasing temperature over a temperature range but not necessarily in proportion thereto. Stated differently, the mutual solubility of the high-boiling and low-boiling components becomes greater as the temperature is lowered. The system is thus distinguished from "positive conjugate systems," such as the system phenol-water, wherein the mutual solubilities of the components becomes greater as the temperature is increased. The remainder of the system, exclusive only of the low-boiling solution, is herein referred to as the "high-boiling solution."

In the case of negative conjugate systems comprising only a high-boiling component and a low-boiling component, it necessarily follows that the high-boiling solution is rich in the high-boiling component and that the concentration of the high-boiling component in the high-boiling solution increases as the temperature is increased. Such systems include those composed of triethyl amine and water or of diethyl amine and water as well as many others.

The invention is, however, not limited to the use of two-component systems. The effects of the addition of a third component in greater or lesser proportions on the mutual solubilities of an otherwise two-component system are well known. Thus, it is often desirable to include in a system a substantial amount of a third component, the mutual solubility of which with the low-boiling component is very low over the entire temperature range of operation of the cycle but the mutual solubility of which the high-boiling component increases rapidly with increase in temperature.

It is apparent that systems useful in the method of the invention can include two or more components and that two or more liquid phases can be in equilibrium with one another in some part of the refrigeration cycle. Systems having a lower consolute temperature are often of particular value in the operation of the method of the invention, but the invention is not limited to operation therewith. It will be further apparent that certain negative conjugate systems contemplated by the invention are preferred over certain others as being operable under more favorable conditions when a particular degree of refrigeration is desired. Thus, certain systems which are well adapted to the establishment of the moderately low temperatures useful in conditioning air are not so well adapted as others to the establishment of the much lower temperatures required in some other instances, e. g. in the quick-freezing of foods. The method will, however, be described with particular reference to the use of the two-component system composed of about equal parts by weight of triethyl amine and water.

In the method or cycle of the invention a negative conjugate system is heated, e. g. in a conventional heating vessel, under suitable pressure to a temperature herein referred to as a "separating temperature," sufficiently high to cause formation in the system of high-boiling and low-boiling conjugate solutions, the low-boiling solution being as noted previously rich in a low-boiling component of the system. The conjugate solutions are then separated from one another at the separating temperature without substantial vaporization of the components thereof. The low-boiling and the high-boiling solutions are then placed in liquid form in separate containers connected by a vapor conduit, e. g. in a vaporizer and in an absorber, respectively, of a conventional absorption type refrigeration apparatus, and the high-boiling solution is cooled by any appropriate means, e. g. by cooling water or air. Under such conditions, vapor of the low-boiling component distills from the low-boiling solution, which is thereby cooled and is thus available for refrigerating purposes, and is absorbed or dissolved in the high-boiling solution, the heat of absorption being dissipated by the cooling means. This process continues until interrupted or until the temperature of the low-boiling solution and the concentrations of the low-boiling component in the high-boiling and in the low-boiling solutions have attained values such that the partial vapor pressure of the low-boiling component in each solution at the respective temperatures is the same. The solutions remaining in the vaporizer and absorber are subsequently combined to furnish the original negative conjugate system which is then heated as in the step first described.

A complete refrigeration cycle is thus effected wherein the gaseous refrigerant is restored to its liquid state ready for re-use without the expenditure and the subsequent dissipation of energy corresponding to the energy of liquefaction described previously. Furthermore, since only liquids are concerned in the heating and separation steps and in the return of the conjugate solutions to the absorber and vaporizer, respectively, heat interchangers can be employed advantageously to carry out the first stages of the heating step using the hot separated high-boiling and low-boiling solutions and the latter thereby cooled before being introduced into the absorber and vaporizer, respectively. In practice, the cycle is preferably carried out in continuous fashion, the conjugate solutions being separated and conveyed to the absorber and vaporizer, respectively, and the residual solutions being withdrawn therefrom and heated, all in continuous manner. In this way substantially constant conditions of temperature and pressure can be maintained in any particular part of the cycle.

In the accompanying drawing there is given a diagrammatic sketch, partially in section, of one apparatus in which the process of the invention can be carried out.

Referring to the drawing, a liquid system capable of forming conjugate solutions at an elevated temperature is forced, e. g. in a conduit 11 as hereinafter explained, through a heater 12 of any suitable design, wherein it is heated to at least its separation temperature, and into a separating vessel 13 wherein the conjugate solutions form liquid layers 14 and 15, one of which is rich in the low-boiling component and the other of which is rich in the high-boiling component. In the present discussion it is assumed, for purposes of description only, that the solution which is rich in the low-boiling component is of lesser density than the solution which is rich in the high-boiling component and that the former, therefore, rises in the vessel 13. It is apparent, however, that with a suitable arrangement of the conduits, systems having the reverse relationship between the compositions and densities of the consolute solutions can be used with equal facility. The junction of the two liquid layers in the separator 13 is indicated by a line 16.

From the separating vessel 13 the layer rich in the high-boiling component, e. g. the layer 15, passes by way of a conduit 17 to an absorber 18 which can be of conventional design and which is equipped with a cooling means, e. g. with a coil 19 through which cooling water circulates and over which the entering liquid is sprayed from a spray head 21. Liquid 22 collects in the lower part of the absorber 18 and returns by way of a pump 20 and conduits 23 and 11 to the heater 12, preferably by way of a heat interchanger 24 to assist in cooling the liquid in the conduit 17.

From the separating vessel 13 the layer rich in the low-boiling component, e. g. the layer 14, passes by way of a conduit 25 to a vaporizer 26 which can be of conventional design, and which is equipped for utilization of the low temperature prevailing therein for refrigeration purposes, e. g. with a coil 27 through which brine is circulated and over which the entering liquid is sprayed from a spray head 28. Liquid 29 collects in the lower part of the vaporizer 26 and is returned by way of a pump 30 and conduits 31 and 11, in which latter conduit it is mixed with liquid 22 from the absorber 18, to the heater 12, preferably through a heat interchanger 32 where it assists in cooling the liquid in the conduit 25. The heat interchangers 24 and 32 should be located between the pumps 20 and 30 respectively, and the junction of the conduits 23 and 31.

Pressure relief valves 41 and 42 are provided in the conduits 17 and 25, respectively, preferably located near the absorber 18 and the vaporizer 26, to keep the conduits 23, 31, 11, 17 and 25 and the heater 12 and the separating vessel 13 at all times free of vapor space. This is accomplished when the valves are adjusted to open at a pressure higher than the total vapor pressure of the mixture in the heater 12 and separator 13 at the highest temperature prevailing therein.

Suitable means can also be provided to regulate the flow of the two liquid layers 14 and 15 from the separating vessel 13 to the vaporizer 26 and the absorber 18 in substantially the same proportion in which they are returned to the separator 13 by the pumps 20 and 30. One such means comprises a valve rod 33, preferably with a conventional means 34 for adjusting its length, and having each of its ends 35 and 36, respectively, ground to a point. Valve seats 37 and 38 are incorporated in the ports opening into the conduits 25 and 17, respectively, in such fashion that one end 35 of the rod 33 will seat on the valve seat 37 when the rod is at the limit of its travel upward and retard the flow of fluid from the vessel 13 through the conduit 25. The length of the rod 33 is adjusted so that when it is at the limit of its travel downward, its other pointed end 36 will seat on the valve seat 38 to retard the flow of fluid from the vessel 13 through the conduit 17. The rod 33 is adjusted to a length such that it can travel longitudinally for a desirable short distance so that both the conduits 17 and 25 are not closed off completely at the same time.

The actual longitudinal travel of the rod 33 is regulated by a float 39 secured to it which has an apparent density such that it floats on the lower or more dense liquid layer 15 but sinks in the upper or less dense liquid layer 14, the float 39 and rod 33 thus effectively maintaining the amounts of the two liquid layers in the vessel 13 substantially constant and releasing them through the respective conduits in the same proportion in which they collect in the vessel. For best results the valves 41 and 42 are set to open at approximately the same pressure. By operating the pumps 20 and 30 and the heater 12 continuously and supplying cooling fluid continuously to the coil 19, the process is rendered continuous and automatic in nature. The process is not limited as to apparatus.

It should be noted that the new cycle, which can be operated in entirely conventional equipment, differs from the conventional compression cycle in that the gaseous refrigerant is absorbed and cooled, rather than being compressed and cooled, at a substantial saving in energy of a costly kind and at a further saving in the installation and maintenance of costly gas compressing machinery. The only mechanical energy required in the new method is that for conveying the residual solutions in liquid form from the absorber and vaporizer into the heating vessel against the vapor pressure of the system at the separating temperature. The new cycle differs from the conventional absorption cycle in that the refrigerant, i. e. the low-boiling component, remains entirely in liquid form from the time it is absorbed in the absorber until it is returned to the vaporizer, a substantial saving in heat energy expended and in condensing equipment thus being effected as compared with the conventional absorption system.

In operating the cycle, a negative conjugate system is preferably selected such that the partial vapor pressure of the low-boiling component in the low-boiling solution formed at the separating temperature is, at the refrigeration temperature desired, substantially higher than the partial vapor pressure of the same component in the high-boiling solution at the temperature of the cooling means available to insure rapid transfer of the low-boiling component from the low-boiling solution to the high-boiling solution. Furthermore, it is evident that a system is preferably selected wherein the high-boiling component has as low a partial vapor pressure as possible in both the high-boiling and low-boiling solutions under the conditions of temperature just mentioned. It is apparent that the actual boiling points of the high-boiling and low-boiling components in a system selected for use in a particular instance will depend upon many factors including the quantity and degree of refrigeration desired, the proportions of the components in the conjugate system, the separation temperature employed, the proportions of the components in the separated high-boiling and low-boiling solutions, the vapor pressure characteristics of the conjugate solutions over the temperature ranges involved and many others. The influence of the many factors involved in the selection of a particular system for use in the production of a particular refrigerating effect under a particular set of operating conditions will, in view of the foregoing description of the invention, be apparent to those familiar with the art concerned, and the recitation here of temperature ranges as inclusive of the boiling points of high-boiling and low-boiling components which can be used is unnecessary.

It has been mentioned previously that the negative conjugate system used in operating the process of the invention can include components in addition to the high-boiling and low-boiling components, the relatively great effects which relatively small proportions of added substances often have on the compositions of conjugate solutions and on consolute temperatures having often been observed. Such additional components which can, for example, be included in varying proportions in the system are components which are much more soluble in the high-boiling component than in the low-boiling component or vice versa, components which are relatively insoluble in either the high-boiling or low-boiling component and components which are highly soluble in both. Auxiliary gases, such as hydrogen or helium, can be used in conventional manner, if desired, to assist in the transfer of vapors of the low-boiling component from the vaporizer to the absorber.

It has been mentioned that the method of the invention is not limited to operation using any particular negative conjugate system. Negative conjugate systems are generally characterized by the formation at lower temperatures of compounds which become unstable when the temperature is increased. Such compounds are formed between certain amines or ammonia and water, aqueous salt or weak acid solutions or other hydroxyl or ether compounds, and the like. Negative consolute systems wherein the low-boiling component is normally gaseous at ordinary room temperature or at only moderately elevated temperatures, such as ammonia, the methyl and ethyl amines, sulfur dioxide, carbon dioxide and others, are preferred, especially when low temperatures are desired. The invention contemplates certain of such hitherto undescribed systems as well as the method described.

The following cyclic operation using a negative conjugate system consisting of substantially equal parts by weight of triethyl amine and water illustrates, but does not limit, the method of the invention. The mixture is heated in a closed container to a temperature of about 70° C., at which temperature it has a vapor pressure of about 450 millimeters of mercury, and the liquid layers which form are separated from one another without cooling and without substantial vaporization thereof. One of the layers contains about 1.6 per cent of triethyl amine and the other contains about 96 per cent of triethyl amine, the balance in each case being water. The layers have specific gravities of approximately 0.98 and 0.71, respectively. The layer containing 1.6 of triethyl amine is introduced into an absorber and cooled with cooling water at about 15° C., at which temperature it has a vapor pressure of about 21 millimeters of mercury, and the layer containing about 96 per cent of triethyl amine is introduced into a vaporizer having a vapor conduit connecting it with the absorber. Triethyl amine distills from the vaporizer and the temperature of the liquid remaining therein falls to 0° C. or slightly above, its vapor pressure at 0° C. being substantially equal to the vapor pressure of the fresh cooled 1.6 per cent solution in the absorber. The triethyl amine vapors are absorbed by the liquid in the absorber. The residual liquids in the vaporizer and absorber are subsequently drawn off and pumped into the heating vessel and heated as first described.

I claim:

1. The method which includes: heating a negative conjugate system comprising a low-boiling component and a high-boiling component to cause the formation therein of a high-boiling conjugate solution and a low-boiling conjugate solution, the low-boiling solution being rich in the low-boiling component; separating the conjugate solutions in liquid form from one another; and cooling the high-boiling solution in vapor contact with the low-boiling solution to cause vaporization of the low-boiling component from the low-boiling solution and the absorption of the vapors in the high-boiling solution.

2. The method which includes: heating a negative conjugate system comprising a high-boiling component and a low-boiling component under a suitable pressure to form a high-boiling conjugate solution and a low-boiling conjugate solution therein, the low-boiling solution being rich in the low-boiling component; separating the conjugate solutions from one another without substantial cooling or vaporization thereof; and cooling the high-boiling solution in vapor contact with the low-boiling solution to cause vaporization of the low-boiling component therefrom and cooling thereof to a temperature below that of the high-boiling solution.

3. The method which includes: heating a negative conjugate system comprising a low-boiling component and a high-boiling component to cause the formation therein of a high-boiling conjugate solution and a low-boiling conjugate solution, the low-boiling solution being rich in the low-boiling component; separating the conjugate solutions from one another; cooling the high-boiling solution in vapor contact with the low-boiling solution to cause vaporization of the low-boiling component from the low-boiling solution and the absorption of the vapors in the high-boiling solution; and subsequently combining the resulting solutions to form the original negative conjugate system.

4. The method of claim 3 wherein the method is carried out in continuous fashion.

5. The method which includes: heating a negative conjugate system comprising a low-boiling component and a high-boiling component and having a lower consolute temperature to cause the formation in the system of a high-boiling conjugate solution and a low-boiling conjugate solution, the latter being rich in the low-boiling component; separating the conjugate solutions from one another without substantial cooling or vaporization thereof; cooling the high-boiling solution to a temperature below the consolute temperature of the negative conjugate system in vapor contact with the low-boiling solution to cause vaporization of the low-boiling component from the low-boiling solution and absorption thereof in the high-boiling solution; and subsequently combining the resulting solutions to form the original negative consolute system.

LINDLEY E. MILLS.

References Cited in the file of this patent

UNITED STATES PATENTS

| Number | Name | Date |
|---|---|---|
| 1,757,254 | Lenning | May 6, 1930 |
| 1,781,541 | Einstein | Nov. 11, 1930 |
| 1,871,879 | Chadwick | Aug. 16, 1932 |
| 1,924,894 | Weaver | Aug. 29, 1933 |
| 2,109,502 | Randel | Mar. 1, 1938 |
| 2,272,856 | Thomas | Feb. 10, 1942 |
| 2,339,812 | Roth | Jan. 25, 1944 |
| 2,379,278 | Coons | June 26, 1945 |